United States Patent
Matthews et al.

(10) Patent No.: US 9,534,550 B2
(45) Date of Patent: Jan. 3, 2017

(54) AIR PER CYLINDER DETERMINATION SYSTEMS AND METHODS

(71) Applicant: GM Global Technology Operations LLC, Detroit, MI (US)

(72) Inventors: Gregory P. Matthews, West Bloomfield, MI (US); Zhiping Steven Liu, Canton, MI (US); Daniel G. Brennan, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 759 days.

(21) Appl. No.: 13/798,471

(22) Filed: Mar. 13, 2013

(65) Prior Publication Data

US 2014/0069375 A1    Mar. 13, 2014

Related U.S. Application Data

(60) Provisional application No. 61/698,857, filed on Sep. 10, 2012.

(51) Int. Cl.
    *F02D 41/00*    (2006.01)
    *F02D 41/18*    (2006.01)
    (Continued)

(52) U.S. Cl.
    CPC ........... *F02D 41/0087* (2013.01); *F02D 35/02* (2013.01); *F02D 37/02* (2013.01); *F02D 41/0007* (2013.01);
    (Continued)

(58) Field of Classification Search
    CPC ................... F02D 2250/18; F02D 2200/1004; F02D 41/0087; F02D 41/0007; F02D 41/18; F02D 37/02; F02D 35/02; F02D 2200/0402; F02D 2041/0012; F02D 2041/001; F02D 2041/1412; F02P 5/045; F02P 5/1512; Y02T 10/46; Y02T 10/144
    (Continued)

(56) References Cited

U.S. PATENT DOCUMENTS 3,596,640 A    8/1971    Bloomfield
4,129,034 A    12/1978   Niles et al.
(Continued)

FOREIGN PATENT DOCUMENTS

CN    1573916 A    2/2005
CN    1888407 A    1/2007
(Continued)

OTHER PUBLICATIONS

U.S. Appl. No. 13/798,351, filed Mar. 13, 2013, Rayl.
(Continued)

*Primary Examiner* — Brian Kirby

(57) ABSTRACT

A cylinder control system of a vehicle includes a cylinder control module and an air per cylinder (APC) prediction module. The cylinder control module determines a desired cylinder activation/deactivation sequence. The cylinder control module also activates and deactivates valves of cylinders of an engine based on the desired cylinder activation/deactivation sequence. The APC prediction module predicts an amount of air that will be trapped within a next activated cylinder in a firing order of the cylinders based on a cylinder activation/deactivation sequence of the last Q cylinders in the firing order. Q is an integer greater than one.

12 Claims, 4 Drawing Sheets

(51) Int. Cl.
*F02P 5/04* (2006.01)
*F02P 5/15* (2006.01)
*F02D 35/02* (2006.01)
*F02D 37/02* (2006.01)
*F02D 41/14* (2006.01)

(52) U.S. Cl.
CPC ............... *F02D 41/18* (2013.01); *F02P 5/045* (2013.01); *F02P 5/1512* (2013.01); *F02D 2041/001* (2013.01); *F02D 2041/0012* (2013.01); *F02D 2041/1412* (2013.01); *F02D 2200/0402* (2013.01); *F02D 2200/1004* (2013.01); *F02D 2250/18* (2013.01); *Y02T 10/144* (2013.01); *Y02T 10/46* (2013.01)

(58) Field of Classification Search
USPC ..... 701/110, 112; 123/325, 332, 90.15, 399, 123/436
See application file for complete search history.

(56) References Cited

U.S. PATENT DOCUMENTS

| | | | |
|---|---|---|---|
| 4,172,434 A | 10/1979 | Coles | |
| 4,377,997 A | 3/1983 | Staerzl | |
| 4,434,767 A | 3/1984 | Kohama et al. | |
| 4,489,695 A | 12/1984 | Kohama et al. | |
| 4,509,488 A | 4/1985 | Forster et al. | |
| 4,535,744 A | 8/1985 | Matsumura | |
| 4,770,148 A | 9/1988 | Hibino et al. | |
| 4,887,216 A * | 12/1989 | Ohnari | F02D 41/008 123/478 |
| 4,974,563 A * | 12/1990 | Ikeda | F02D 41/105 123/480 |
| 4,987,888 A * | 1/1991 | Funabashi | F02D 41/045 123/406.46 |
| 5,042,444 A | 8/1991 | Hayes et al. | |
| 5,094,213 A | 3/1992 | Dudek et al. | |
| 5,226,513 A | 7/1993 | Shibayama | |
| 5,278,760 A | 1/1994 | Ribbens et al. | |
| 5,357,932 A * | 10/1994 | Clinton | F02D 13/0219 123/478 |
| 5,374,224 A | 12/1994 | Huffmaster et al. | |
| 5,377,631 A | 1/1995 | Schechter | |
| 5,423,208 A * | 6/1995 | Dudek | F02D 41/045 123/478 |
| 5,465,617 A * | 11/1995 | Dudek | F02D 41/18 73/1.34 |
| 5,496,227 A | 3/1996 | Minowa et al. | |
| 5,540,633 A | 7/1996 | Yamanaka et al. | |
| 5,553,575 A | 9/1996 | Beck et al. | |
| 5,584,266 A | 12/1996 | Motose et al. | |
| 5,669,354 A | 9/1997 | Morris | |
| 5,692,471 A | 12/1997 | Zhang | |
| 5,720,257 A | 2/1998 | Motose et al. | |
| 5,778,858 A | 7/1998 | Garabedian | |
| 5,813,383 A | 9/1998 | Cummings | |
| 5,884,605 A | 3/1999 | Nagaishi et al. | |
| 5,909,720 A | 6/1999 | Yamaoka et al. | |
| 5,931,140 A | 8/1999 | Maloney | |
| 5,934,263 A | 8/1999 | Russ et al. | |
| 5,941,927 A | 8/1999 | Pfitz | |
| 5,974,870 A | 11/1999 | Treinies et al. | |
| 5,975,052 A | 11/1999 | Moyer | |
| 5,983,867 A | 11/1999 | Stuber et al. | |
| 6,125,812 A | 10/2000 | Garabedian | |
| 6,158,411 A | 12/2000 | Morikawa | |
| 6,244,242 B1 | 6/2001 | Grizzle et al. | |
| 6,247,449 B1 | 6/2001 | Persson | |
| 6,272,427 B1 | 8/2001 | Wild et al. | |
| 6,286,366 B1 | 9/2001 | Chen et al. | |
| 6,295,500 B1 | 9/2001 | Cullen et al. | |
| 6,332,446 B1 | 12/2001 | Matsumoto et al. | |
| 6,334,425 B1 | 1/2002 | Nagatani et al. | |
| 6,355,986 B1 | 3/2002 | Kato et al. | |
| 6,360,724 B1 | 3/2002 | Suhre et al. | |
| 6,363,316 B1 * | 3/2002 | Soliman | F02D 11/105 123/399 |
| 6,371,075 B2 | 4/2002 | Koch | |
| 6,385,521 B1 | 5/2002 | Ito | |
| 6,408,625 B1 | 6/2002 | Woon et al. | |
| 6,520,140 B2 | 2/2003 | Dreymuller et al. | |
| 6,546,912 B2 | 4/2003 | Tuken | |
| 6,588,261 B1 | 7/2003 | Wild et al. | |
| 6,619,258 B2 | 9/2003 | McKay et al. | |
| 6,622,548 B1 * | 9/2003 | Hernandez | F02D 41/1447 73/114.31 |
| 6,694,806 B2 | 2/2004 | Kumagai et al. | |
| 6,738,707 B2 | 5/2004 | Kotwicki et al. | |
| 6,754,577 B2 | 6/2004 | Gross et al. | |
| 6,760,656 B2 * | 7/2004 | Matthews | F02D 41/0087 123/480 |
| 6,850,831 B2 | 2/2005 | Buckland et al. | |
| 6,909,961 B2 | 6/2005 | Wild et al. | |
| 6,978,204 B2 | 12/2005 | Surnilla et al. | |
| 6,980,902 B2 | 12/2005 | Nakazawa | |
| 6,981,492 B2 | 1/2006 | Barba et al. | |
| 6,983,737 B2 | 1/2006 | Gross et al. | |
| 7,003,390 B2 | 2/2006 | Kaga | |
| 7,024,301 B1 | 4/2006 | Kar et al. | |
| 7,025,041 B2 | 4/2006 | Abe et al. | |
| 7,028,661 B1 | 4/2006 | Bonne et al. | |
| 7,032,545 B2 | 4/2006 | Lewis et al. | |
| 7,032,581 B2 | 4/2006 | Gibson et al. | |
| 7,044,101 B1 | 5/2006 | Duty et al. | |
| 7,063,062 B2 | 6/2006 | Lewis et al. | |
| 7,066,121 B2 | 6/2006 | Michelini et al. | |
| 7,066,136 B2 | 6/2006 | Ogiso | |
| 7,069,718 B2 | 7/2006 | Surnilla et al. | |
| 7,069,773 B2 | 7/2006 | Stempnik et al. | |
| 7,086,386 B2 | 8/2006 | Doering | |
| 7,100,720 B2 | 9/2006 | Ishikawa | |
| 7,111,612 B2 | 9/2006 | Michelini et al. | |
| 7,140,355 B2 | 11/2006 | Michelini et al. | |
| 7,159,568 B1 * | 1/2007 | Lewis | F02D 19/084 123/299 |
| 7,174,713 B2 | 2/2007 | Nitzke et al. | |
| 7,174,879 B1 | 2/2007 | Chol et al. | |
| 7,200,486 B2 * | 4/2007 | Tanaka | F02D 11/105 701/103 |
| 7,203,588 B2 | 4/2007 | Kaneko et al. | |
| 7,231,907 B2 * | 6/2007 | Bolander | F02D 13/06 123/198 F |
| 7,278,391 B1 | 10/2007 | Wong et al. | |
| 7,292,231 B2 | 11/2007 | Kodama et al. | |
| 7,292,931 B2 * | 11/2007 | Davis | F02D 41/18 701/102 |
| 7,319,929 B1 * | 1/2008 | Davis | F02D 41/18 123/361 |
| 7,363,111 B2 | 4/2008 | Vian et al. | |
| 7,367,318 B2 | 5/2008 | Moriya et al. | |
| 7,415,345 B2 | 8/2008 | Wild | |
| 7,440,838 B2 | 10/2008 | Livshiz et al. | |
| 7,464,676 B2 | 12/2008 | Wiggins et al. | |
| 7,472,014 B1 * | 12/2008 | Albertson | F02D 41/0087 123/198 F |
| 7,497,074 B2 | 3/2009 | Surnilla et al. | |
| 7,499,791 B2 | 3/2009 | You et al. | |
| 7,503,312 B2 | 3/2009 | Surnilla et al. | |
| 7,509,201 B2 | 3/2009 | Bolander et al. | |
| 7,555,896 B2 | 7/2009 | Lewis et al. | |
| 7,577,511 B1 | 8/2009 | Tripathi et al. | |
| 7,581,531 B2 | 9/2009 | Schulz | |
| 7,614,384 B2 * | 11/2009 | Livshiz | F02D 11/105 123/399 |
| 7,620,188 B2 | 11/2009 | Inoue et al. | |
| 7,621,262 B2 | 11/2009 | Zubeck | |
| 7,634,349 B2 | 12/2009 | Senft et al. | |
| 7,685,976 B2 | 3/2010 | Marriott | |
| 7,785,230 B2 | 8/2010 | Gibson et al. | |
| 7,836,866 B2 | 11/2010 | Luken et al. | |
| 7,849,835 B2 | 12/2010 | Tripathi et al. | |

(56) References Cited

U.S. PATENT DOCUMENTS

| | | |
|---|---|---|
| 7,886,715 B2 | 2/2011 | Tripathi et al. |
| 7,930,087 B2 | 4/2011 | Gibson et al. |
| 7,946,263 B2 | 5/2011 | O'Neill et al. |
| 7,954,474 B2 | 6/2011 | Tripathi et al. |
| 8,050,841 B2 * | 11/2011 | Costin ............... F02D 41/0087 123/399 |
| 8,099,224 B2 | 1/2012 | Tripathi et al. |
| 8,108,132 B2 | 1/2012 | Reinke |
| 8,131,445 B2 | 3/2012 | Tripathi et al. |
| 8,131,447 B2 | 3/2012 | Tripathi et al. |
| 8,135,410 B2 | 3/2012 | Forte |
| 8,145,410 B2 | 3/2012 | Berger et al. |
| 8,146,565 B2 | 4/2012 | Leone et al. |
| 8,272,367 B2 | 9/2012 | Shikama et al. |
| 8,347,856 B2 | 1/2013 | Leone et al. |
| 8,402,942 B2 | 3/2013 | Tripathi et al. |
| 8,473,179 B2 | 6/2013 | Whitney et al. |
| 8,616,181 B2 | 12/2013 | Sahandiesfanjani et al. |
| 8,646,430 B2 | 2/2014 | Kinoshita |
| 8,646,435 B2 | 2/2014 | Dibble et al. |
| 8,701,628 B2 | 4/2014 | Tripathi et al. |
| 8,706,383 B2 | 4/2014 | Sauve et al. |
| 8,833,058 B2 | 9/2014 | Ervin et al. |
| 8,833,345 B2 | 9/2014 | Pochner et al. |
| 8,869,773 B2 | 10/2014 | Tripathi et al. |
| 8,979,708 B2 | 3/2015 | Burtch |
| 9,020,735 B2 | 4/2015 | Tripathi et al. |
| 9,140,622 B2 | 9/2015 | Beikmann |
| 9,200,575 B2 | 12/2015 | Shost |
| 9,212,610 B2 | 12/2015 | Chen et al. |
| 9,222,427 B2 | 12/2015 | Matthews et al. |
| 2001/0007964 A1 | 7/2001 | Poljansek et al. |
| 2002/0038654 A1 | 4/2002 | Sasaki et al. |
| 2002/0039950 A1 | 4/2002 | Graf et al. |
| 2002/0156568 A1 | 10/2002 | Knott et al. |
| 2002/0162540 A1 | 11/2002 | Matthews et al. |
| 2002/0189574 A1 | 12/2002 | Kim |
| 2003/0116130 A1 | 6/2003 | Kisaka et al. |
| 2003/0123467 A1 | 7/2003 | Du et al. |
| 2003/0131820 A1 | 7/2003 | Mckay et al. |
| 2003/0172900 A1 | 9/2003 | Boyer et al. |
| 2004/0007211 A1 * | 1/2004 | Kobayashi .......... F02D 41/1401 123/472 |
| 2004/0034460 A1 * | 2/2004 | Folkerts ............. B60W 30/188 701/54 |
| 2004/0069290 A1 | 4/2004 | Bucktron et al. |
| 2004/0122584 A1 | 6/2004 | Muto et al. |
| 2004/0129249 A1 * | 7/2004 | Kondo ................ F01L 13/0063 123/346 |
| 2004/0138027 A1 | 7/2004 | Rustige et al. |
| 2004/0206072 A1 | 10/2004 | Surnilla et al. |
| 2004/0258251 A1 | 12/2004 | Inoue et al. |
| 2005/0016492 A1 | 1/2005 | Matthews |
| 2005/0056250 A1 * | 3/2005 | Stroh .................... F02D 11/105 123/350 |
| 2005/0098156 A1 | 5/2005 | Ohtani |
| 2005/0131618 A1 | 6/2005 | Megli et al. |
| 2005/0197761 A1 | 9/2005 | Bidner et al. |
| 2005/0199220 A1 | 9/2005 | Ogiso |
| 2005/0204726 A1 | 9/2005 | Lewis |
| 2005/0204727 A1 | 9/2005 | Lewis et al. |
| 2005/0205028 A1 | 9/2005 | Lewis et al. |
| 2005/0205045 A1 | 9/2005 | Michelini et al. |
| 2005/0205060 A1 | 9/2005 | Michelini et al. |
| 2005/0205063 A1 | 9/2005 | Kolmanovsky et al. |
| 2005/0205069 A1 | 9/2005 | Lewis et al. |
| 2005/0205074 A1 | 9/2005 | Gibson et al. |
| 2005/0235743 A1 | 10/2005 | Stempnik et al. |
| 2006/0107919 A1 | 5/2006 | Nishi et al. |
| 2006/0112918 A1 | 6/2006 | Persson |
| 2006/0130814 A1 | 6/2006 | Bolander et al. |
| 2006/0178802 A1 | 8/2006 | Bolander et al. |
| 2007/0012040 A1 | 1/2007 | Nitzke et al. |
| 2007/0042861 A1 | 2/2007 | Takaoka et al. |
| 2007/0051351 A1 | 3/2007 | Pallett et al. |
| 2007/0100534 A1 | 5/2007 | Katsumata |
| 2007/0101969 A1 | 5/2007 | Lay et al. |
| 2007/0107692 A1 | 5/2007 | Kuo et al. |
| 2007/0131169 A1 | 6/2007 | Ahn |
| 2007/0131196 A1 | 6/2007 | Gibson et al. |
| 2007/0135988 A1 | 6/2007 | Kidston et al. |
| 2007/0235005 A1 | 10/2007 | Lewis |
| 2008/0000149 A1 | 1/2008 | Aradi |
| 2008/0041327 A1 | 2/2008 | Lewis et al. |
| 2008/0066699 A1 | 3/2008 | Michelini et al. |
| 2008/0098969 A1 | 5/2008 | Reed et al. |
| 2008/0109151 A1 | 5/2008 | Jaros et al. |
| 2008/0121211 A1 | 5/2008 | Livshiz et al. |
| 2008/0154468 A1 | 6/2008 | Berger et al. |
| 2008/0254926 A1 | 10/2008 | Schuseil et al. |
| 2008/0262698 A1 | 10/2008 | Lahti et al. |
| 2008/0288146 A1 | 11/2008 | Beechie et al. |
| 2009/0007877 A1 | 1/2009 | Raiford |
| 2009/0013667 A1 | 1/2009 | Winstead |
| 2009/0013668 A1 | 1/2009 | Winstead |
| 2009/0013669 A1 | 1/2009 | Winstead |
| 2009/0013969 A1 | 1/2009 | Winstead |
| 2009/0018746 A1 | 1/2009 | Miller et al. |
| 2009/0030594 A1 | 1/2009 | You et al. |
| 2009/0042458 A1 | 2/2009 | Kinoshita |
| 2009/0042463 A1 | 2/2009 | Kinoshita |
| 2009/0118914 A1 | 5/2009 | Schwenke et al. |
| 2009/0118965 A1 | 5/2009 | Livshiz et al. |
| 2009/0118968 A1 | 5/2009 | Livshiz et al. |
| 2009/0118975 A1 | 5/2009 | Murakami et al. |
| 2009/0118986 A1 | 5/2009 | Kita |
| 2009/0177371 A1 | 7/2009 | Reinke |
| 2009/0204312 A1 | 8/2009 | Moriya |
| 2009/0229562 A1 | 9/2009 | Ramappan et al. |
| 2009/0241872 A1 | 10/2009 | Wang et al. |
| 2009/0248277 A1 | 10/2009 | Shinagawa et al. |
| 2009/0248278 A1 | 10/2009 | Nakasaka |
| 2009/0292435 A1 * | 11/2009 | Costin ................ F02D 41/0087 701/84 |
| 2010/0006065 A1 | 1/2010 | Tripathi et al. |
| 2010/0010724 A1 | 1/2010 | Tripathi et al. |
| 2010/0012072 A1 | 1/2010 | Leone et al. |
| 2010/0030447 A1 | 2/2010 | Smyth et al. |
| 2010/0036571 A1 | 2/2010 | Han et al. |
| 2010/0042308 A1 | 2/2010 | Kobayashi et al. |
| 2010/0050993 A1 | 3/2010 | Zhao et al. |
| 2010/0057283 A1 | 3/2010 | Worthing et al. |
| 2010/0059004 A1 | 3/2010 | Gill |
| 2010/0100299 A1 | 4/2010 | Tripathi et al. |
| 2010/0107630 A1 | 5/2010 | Hamama et al. |
| 2010/0211299 A1 | 8/2010 | Lewis et al. |
| 2010/0222989 A1 | 9/2010 | Nishimura |
| 2010/0282202 A1 | 11/2010 | Luken |
| 2010/0318275 A1 | 12/2010 | Borchsenius et al. |
| 2011/0005496 A1 * | 1/2011 | Hiraya .................. F02D 15/02 123/48 B |
| 2011/0030657 A1 | 2/2011 | Tripathi et al. |
| 2011/0048372 A1 | 3/2011 | Dibble et al. |
| 2011/0088661 A1 | 4/2011 | Sczomak et al. |
| 2011/0094475 A1 | 4/2011 | Riegel et al. |
| 2011/0107986 A1 | 5/2011 | Winstead |
| 2011/0118955 A1 | 5/2011 | Livshiz et al. |
| 2011/0144883 A1 | 6/2011 | Rollinger et al. |
| 2011/0178693 A1 | 7/2011 | Chang et al. |
| 2011/0208405 A1 | 8/2011 | Tripathi et al. |
| 2011/0213526 A1 | 9/2011 | Giles et al. |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2011/0264342 A1 * | 10/2011 | Baur .................... F02D 41/0002 701/54 |
| 2011/0265454 A1 | 11/2011 | Smith et al. |
| 2011/0265771 A1 * | 11/2011 | Banker ................ F01N 3/0814 123/564 |
| 2011/0295483 A1 * | 12/2011 | Ma ...................... F02D 41/0002 701/102 |
| 2011/0313643 A1 | 12/2011 | Lucatello et al. |

(56) References Cited

U.S. PATENT DOCUMENTS

| | | |
|---|---|---|
| 2012/0029787 A1* | 2/2012 | Whitney ............ F02D 13/0207 701/102 |
| 2012/0055444 A1 | 3/2012 | Tobergte et al. |
| 2012/0103312 A1 | 5/2012 | Sasai et al. |
| 2012/0109495 A1 | 5/2012 | Tripathi et al. |
| 2012/0116647 A1 | 5/2012 | Pochner et al. |
| 2012/0143471 A1 | 6/2012 | Tripathi et al. |
| 2012/0180759 A1 | 7/2012 | Whitney et al. |
| 2012/0221217 A1 | 8/2012 | Sujan et al. |
| 2012/0285161 A1 | 11/2012 | Kerns et al. |
| 2013/0092127 A1 | 4/2013 | Pirjaberi et al. |
| 2013/0092128 A1 | 4/2013 | Pirjaberi et al. |
| 2013/0184949 A1 | 7/2013 | Saito et al. |
| 2013/0289853 A1 | 10/2013 | Serrano |
| 2014/0041625 A1 | 2/2014 | Pirjaberi et al. |
| 2014/0041641 A1 | 2/2014 | Carlson et al. |
| 2014/0053802 A1 | 2/2014 | Rayl |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069376 A1 | 3/2014 | Matthews et al. |
| 2014/0069377 A1 | 3/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190448 A1 | 7/2014 | Brennan et al. |
| 2014/0190449 A1 | 7/2014 | Phillips |
| 2014/0194247 A1 | 7/2014 | Burtch |
| 2014/0207359 A1 | 7/2014 | Phillips |
| 2015/0240671 A1 | 8/2015 | Nakamura |
| 2015/0260112 A1 | 9/2015 | Liu et al. |
| 2015/0260117 A1 | 9/2015 | Shost et al. |
| 2015/0354470 A1 | 12/2015 | Li et al. |
| 2015/0361907 A1 | 12/2015 | Hayman et al. |

FOREIGN PATENT DOCUMENTS

| | | |
|---|---|---|
| CN | 101220780 A | 7/2008 |
| CN | 101353992 A | 1/2009 |
| CN | 101476507 A | 7/2009 |
| CN | 101586504 A | 11/2009 |
| CN | 102454493 A | 5/2012 |
| EP | 1489595 A2 | 12/2004 |
| JP | 2010223019 A | 10/2010 |
| JP | 2011149352 A | 8/2011 |

OTHER PUBLICATIONS

U.S. Appl. No. 13/798,384, filed Mar. 13, 2013, Burtch.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,737, filed Mar. 13, 2013, Beikmann.
U.S. Appl. No. 13/798,775, filed Mar. 13, 2013, Phillips.
U.S. Appl. No. 13/799,116, filed Mar. 13, 2013, Brennan.
U.S. Appl. No. 13/799,129, filed Mar. 13, 2013, Beikmann.
U.S. Appl. No. 13/799,181, filed Mar. 13, 2013, Beikmann.
U.S. Appl. No. 14/211,389, Liu et al.
U.S. Appl. No. 14/300,469, filed Jun. 10, 2014, Li et al.
U.S. Appl. No. 14/310,063, filed Jun. 20, 2014, Wagh et al.
U.S. Appl. No. 14/449,426, filed Aug. 1, 2014, Hayman et al.
U.S. Appl. No. 14/734,619, filed Jun. 9, 2015, Matthews.
International Search Report and Written Opinion dated Jun. 17, 2015 corresponding to International Application No. PCT/US2015/019496, 14 pages.
U.S. Appl. No. 14/548,501, filed Nov. 20, 2014, Beikmann et al.
U.S. Appl. No. 61/952,737, filed Mar. 13, 2014, Shost et al.
Glossary of Judicial Claim Constructions in the Electronics, Computer and Business Method Arts. Public Patent Foundation. (2010).

\* cited by examiner

… …

AIR PER CYLINDER DETERMINATION SYSTEMS AND METHODS

CROSS-REFERENCE TO RELATED APPLICATIONS

This application claims the benefit of U.S. Provisional Application No. 61/698,857, filed on Sep. 10, 2012. The disclosure of the above application is incorporated herein by reference in its entirety.

This application is related to U.S. patent application Ser. No. 13/798,451 filed on Mar. 13, 2013, Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,536 filed on Mar. 13, 2013, Ser. No. 13/798,435 filed on Mar. 13, 2013, Ser. No. 13/798,737 filed on Mar. 13, 2013, Ser. No. 13/798,701 filed on Mar. 13, 2013,13/798,518 filed on Mar. 13, 2013, Ser. No. 13/799,129 filed on Mar. 13, 2013, Ser. No. 13/798,540 filed on Mar. 13, 2013, Ser. No. 13/798,574 filed on Mar. 13, 2013, Ser. No. 13/799,181 filed on Mar. 13, 2013, Ser. No. 13/799,116 filed on Mar. 13, 2013, Ser. No. 13/798,624 filed on Mar. 13, 2013, Ser. No. 13/798,384 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to internal combustion engines and more specifically to engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Under some circumstances, one or more cylinders of an engine may be deactivated. Deactivation of a cylinder may include deactivating opening and closing of intake valves of the cylinder and halting fueling of the cylinder. One or more cylinders may be deactivated, for example, to decrease fuel consumption when the engine can produce a requested amount of torque while the one or more cylinders are deactivated.

SUMMARY

A cylinder control system of a vehicle includes a cylinder control module and an air per cylinder (APC) prediction module. The cylinder control module determines a desired cylinder activation/deactivation sequence. The cylinder control module also activates and deactivates valves of cylinders of an engine based on the desired cylinder activation/deactivation sequence. The APC prediction module predicts an amount of air that will be trapped within a next activated cylinder in a firing order of the cylinders based on a cylinder activation/deactivation sequence of the last Q cylinders in the firing order. Q is an integer greater than one.

In other features, a cylinder control method includes: determining a desired cylinder activation/deactivation sequence; and activating and deactivating valves of cylinders of an engine based on the desired cylinder activation/deactivation sequence. The cylinder control method further includes predicting an amount of air that will be trapped within a next activated cylinder in a firing order of the cylinders based on a cylinder activation/deactivation sequence of the last Q cylinders in the firing order. Q is an integer greater than one.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Internal combustion engines combust an air and fuel mixture within cylinders to generate torque. Under some circumstances, an engine control module (ECM) may deactivate one or more cylinders of the engine. The ECM may deactivate one or more cylinders, for example, to decrease fuel consumption when the engine can produce a requested amount of torque while the one or more cylinders are deactivated. Deactivation of a cylinder may include deactivating opening and closing of intake valves of the cylinder and halting fueling of the cylinder.

The ECM of the present disclosure determines a desired activation/deactivation sequence for the cylinders. The ECM may determine the desired activation/deactivation sequence, for example, to optimize fuel efficiency, drive quality, and/or noise and vibration (N&V) under the operating conditions. The ECM activates and deactivates cylinders of the engine according to the desired activation/deactivation sequence.

The ECM predicts an amount of air that will be trapped within a next activated cylinder in a predetermined firing order of the cylinders. The ECM also predicts an amount of air that will be trapped within a second activated cylinder following the next activated cylinder in the firing order. One or more engine operating parameters, such as spark timing, fueling, throttle opening, valve phasing, and/or boost, may be regulated based on one or both of the predicted amounts.

The sequence in which the cylinders are activated and deactivated, however, may affect the amount of air that is trapped within the next activated cylinder and/or the amount of air that is trapped within the second activated cylinder. The ECM therefore determines the predicted amounts based on the cylinder activation/deactivation sequence used for the last Q cylinders in the firing order.

Figure 1:
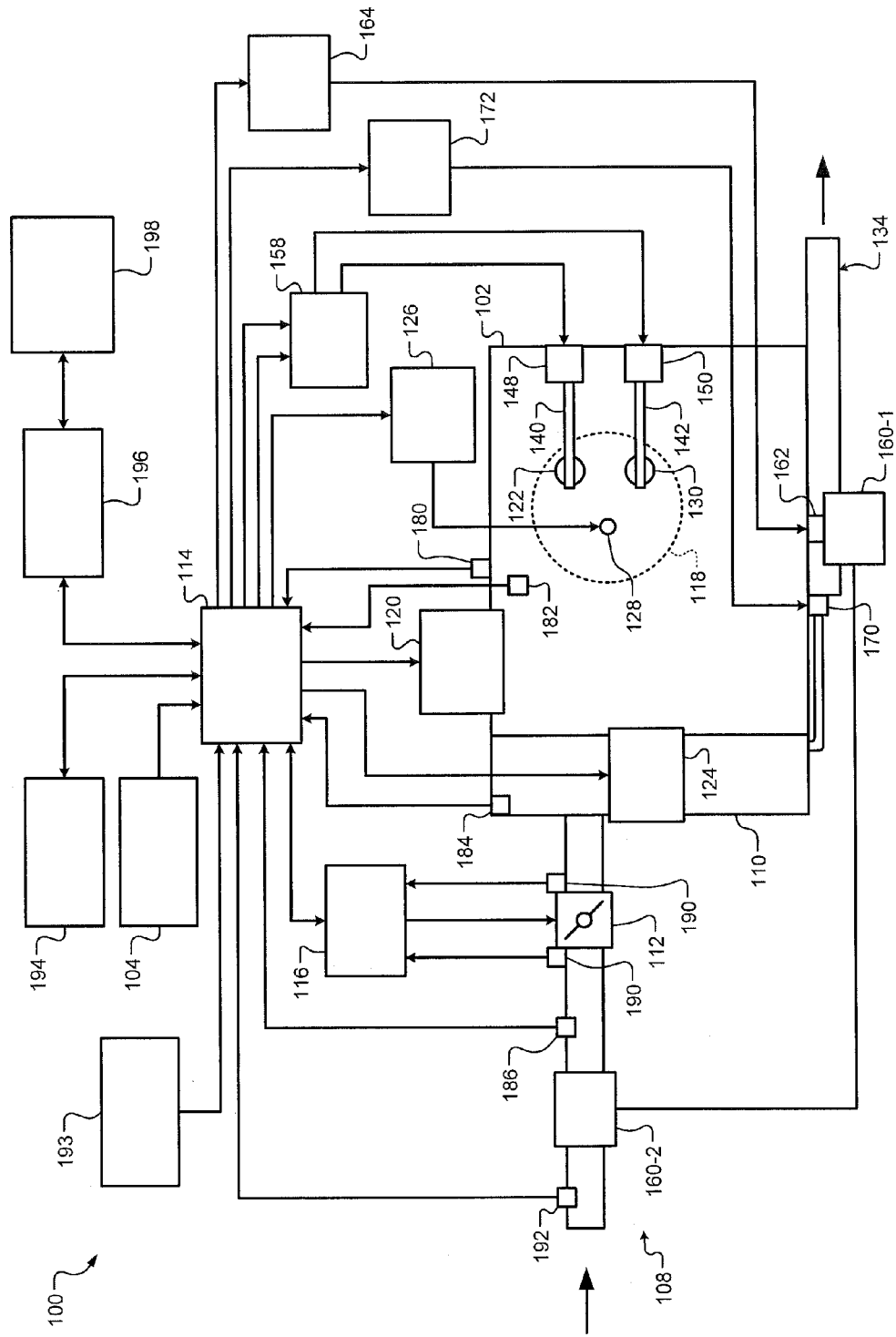
FIG. 1 is a functional block diagram of an example engine system according to the present disclosure.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle. The four strokes, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented.

The cylinder actuator module 120 may deactivate the cylinder 118 by disabling opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The engine 102 outputs torque to a transmission (not shown) via the crankshaft. One or more coupling devices, such as a torque converter and/or one or more clutches, regulate torque transfer between a transmission input shaft and the crankshaft. Torque is transferred between the transmission input shaft and a transmission output shaft via the gears.

Torque is transferred between the transmission output shaft and wheels of the vehicle via one or more differentials, driveshafts, etc. Wheels that receive torque output by the transmission may be referred to as driven wheels. Wheels that do not receive torque from the transmission may be referred to as undriven wheels.

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may control the actuator values in order to cause the engine 102 to generate a desired engine output torque.

Figure 2:
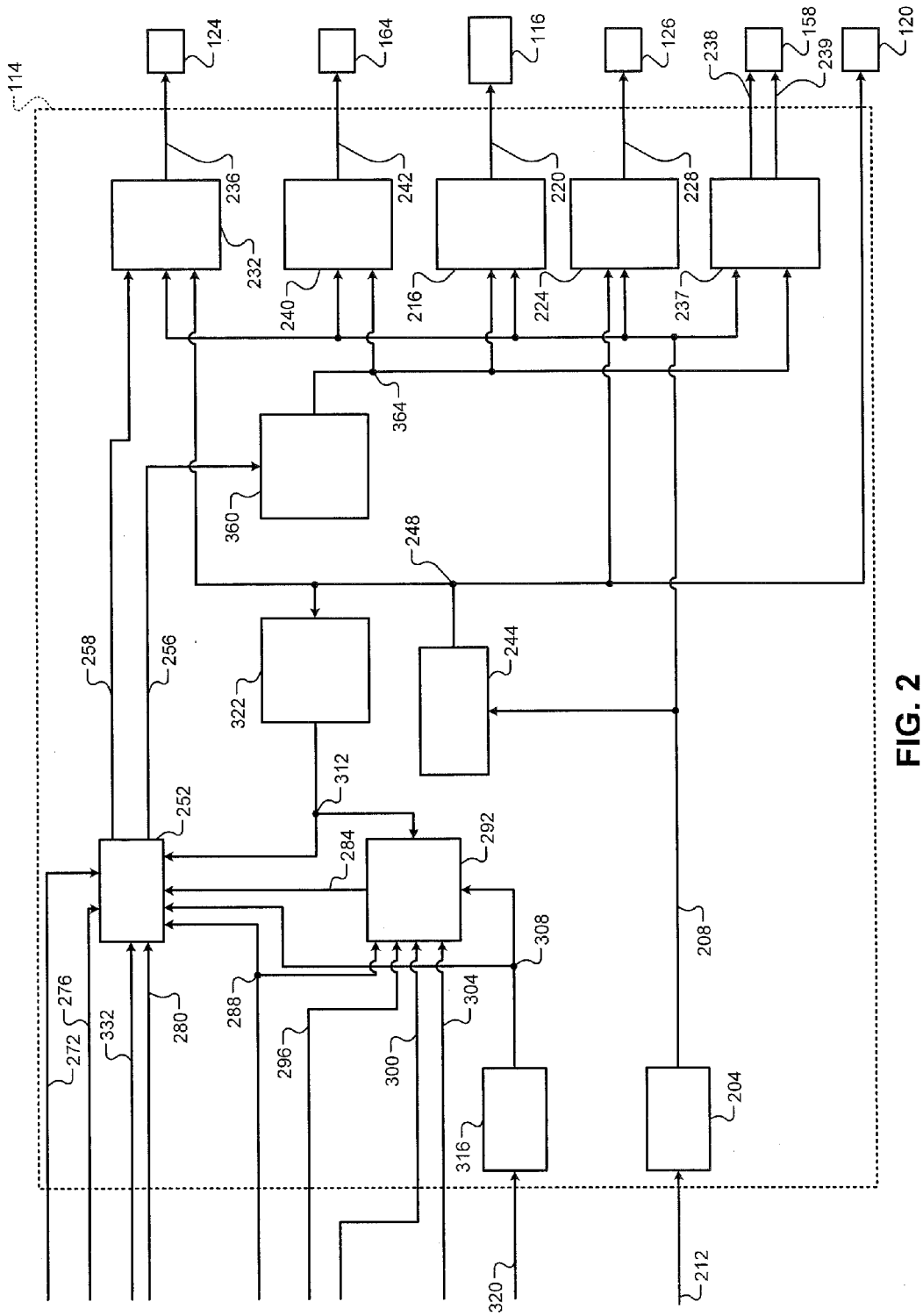
FIG. 2 is a functional block diagram of an example engine control system according to the present disclosure.

Referring now to FIG. 2, a functional block diagram of an example engine control system is presented. A torque request module 204 may determine a torque request 208 based on one or more driver inputs 212, such as an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators may be controlled based on the torque request 208 and/or one or more other parameters. For example, a throttle control module 216 may determine a desired throttle opening 220 based on the torque request 208. The throttle actuator module 116 may adjust opening of the throttle valve 112 based on the desired throttle opening 220.

A spark control module 224 may determine a desired spark timing 228 based on the torque request 208. The spark actuator module 126 may generate spark based on the desired spark timing 228. A fuel control module 232 may determine one or more desired fueling parameters 236 based on the torque request 208. For example, the desired fueling parameters 236 may include fuel injection amount, number of fuel injections for injecting the amount, and timing for each of the injections. The fuel actuator module 124 may inject fuel based on the desired fueling parameters 236.

A phaser control module 237 may determine desired intake and exhaust cam phaser angles 238 and 239 based on the torque request 208. The phaser actuator module 158 may regulate the intake and exhaust cam phasers 148 and 150 based on the desired intake and exhaust cam phaser angles 238 and 239, respectively. A boost control module 240 may determine a desired boost 242 based on the torque request 208. The boost actuator module 164 may control boost output by the boost device(s) based on the desired boost 242.

A cylinder control module 244 determines a desired cylinder activation/deactivation sequence 248 based on the torque request 208. The cylinder actuator module 120 deactivates the intake and exhaust valves of the cylinders that are to be deactivated according to the desired cylinder activation/deactivation sequence 248. The cylinder actuator module 120 allows opening and closing of the intake and exhaust valves of cylinders that are to be activated according to the desired cylinder activation/deactivation sequence 248.

Fueling is halted (zero fueling) to cylinders that are to be deactivated according to the desired cylinder activation/deactivation sequence 248, and fuel is provided to the cylinders that are to be activated according to the desired cylinder activation/deactivation sequence 248. Spark is provided to the cylinders that are to be activated according to the desired cylinder activation/deactivation sequence 248. Spark may be provided or halted to cylinders that are to be deactivated according to the desired cylinder activation/deactivation sequence 248. Cylinder deactivation is different than fuel cutoff (e.g., deceleration fuel cutoff) in that the intake and exhaust valves of cylinders to which fueling is halted during fuel cutoff are still opened and closed during the fuel cutoff whereas the intake and exhaust valves are maintained closed when deactivated.

In various implementations, N (number of) predetermined cylinder activation/deactivation sequences are stored, such as in a sequence database. N is an integer greater than 2 and may be, for example, 3, 4, 5, 6, 7, 8, 9, 10, or another suitable value.

Each of the N predetermined cylinder activation/deactivation sequences includes one indicator for each of the next M events of a predetermined firing order of the cylinders. M may be an integer that is greater than the total number of cylinders of the engine 102. For example only, M may be 20, 40, 60, 80, a multiple of the total number of cylinders of the engine, or another suitable number. In various implementations, M may be less than the total number of cylinders of the engine 102. M may be calibratable and set based on, for example, the total number of cylinders of the engine 102, engine speed, and/or torque.

Each of the M indicators indicates whether the corresponding cylinder in the firing order should be activated or deactivated. For example only, the N predetermined cylinder activation/deactivation sequences may each include an array including M (number of) zeros and/or ones. A zero may indicate that the corresponding cylinder should be activated, and a one may indicate that the corresponding cylinder should be deactivated, or vice versa.

The following cylinder activation/deactivation sequences are provided as examples of predetermined cylinder activation/deactivation sequences.

(1) [0 1 0 1 0 1 . . . 0 1]
(2) [0 0 1 0 0 1 . . . 0 0 1]
(3) [0 0 0 1 0 0 0 1 0 0 0 1]
(4) [0 0 0 0 0 0 . . . 0 0]
(5) [1 1 1 1 1 1 1 1]
(6) [0 1 1 0 1 1 . . . 0 1 1]
(7) [0 0 1 1 0 0 1 1 . . . 0 0 1 1]
(8) [0 1 1 1 0 1 1 1 . . . 0 1 1 1]

Sequence (1) corresponds to a repeating pattern of one cylinder in the firing order being activated, the next cylinder in the firing order being deactivated, the next cylinder in the firing order being activated, and so on. Sequence (2) corresponds to a repeating pattern of two consecutive cylinders in the firing order being activated, the next cylinder in the firing order being deactivated, the next two consecutive cylinders in the firing order being activated, and so on. Sequence (3) corresponds to a repeating pattern of three consecutive cylinders in the firing order being activated, the next cylinder in the firing order being deactivated, the next three consecutive cylinders in the firing order being activated, and so on. Sequence (4) corresponds to all of the cylinders being activated, and sequence (5) corresponds to all of the cylinders being deactivated. Sequence (6) corresponds to a repeating pattern of one cylinder in the firing order being activated, the next two consecutive cylinders in the firing order being deactivated, the next cylinder in the firing order being activated, and so on. Sequence (7) corresponds to a repeating pattern of two consecutive cylinders in the firing order being activated, the next two consecutive cylinders in the firing order being deactivated, the next two consecutive cylinders in the firing order being activated, and so on. Sequence (8) corresponds to a repeating pattern of one cylinder in the firing order being activated, the next three consecutive cylinders in the firing order being deactivated, the next cylinder in the firing order being activated, and so on.

While the 8 example cylinder activation/deactivation sequences have been provided above, numerous other cylinder activation/deactivation sequences are possible. Also, while repeating patterns have been provided as examples, one or more non-repeating cylinder activation/deactivation sequences may be included. While the N predetermined cylinder activation/deactivation sequences have been discussed as being stored in arrays, the N predetermined cylinder activation/deactivation sequences may be stored in another suitable form.

The cylinder control module 244 may select one of the N predetermined cylinder activation/deactivation sequences and set the desired cylinder activation/deactivation sequence 248 to the selected one of the N predetermined cylinder activation/deactivation sequences. In various implementations, the cylinder control module 244 may determine the desired cylinder activation/deactivation sequence 248 as opposed to setting the desired cylinder activation/deactivation sequence 248 to one of N predetermined cylinder activation/deactivation sequences. The cylinders of the engine 102 are activated or deactivated according to the desired cylinder activation/deactivation sequence 248 in the firing order. The desired cylinder activation/deactivation sequence 248 may be repeated until the desired cylinder activation/deactivation sequence 248 is changed.

An air per cylinder (APC) module 252 (see also FIG. 3) generates a predicted mass of air that will be trapped within the next (activated) cylinder in the firing order of the cylinders. The predicted mass of air that will be trapped within the next cylinder in the firing order will be referred to as a first predicted APC (APC1) 256. The APC module 252 also generates a predicted mass of air that will be trapped within the next (activated) cylinder following the next (activated) cylinder in the firing order. The predicted mass of air that will be trapped within the cylinder following the next cylinder in the firing order will be referred to as a second predicted APC (APC2) 258.

Figure 3:
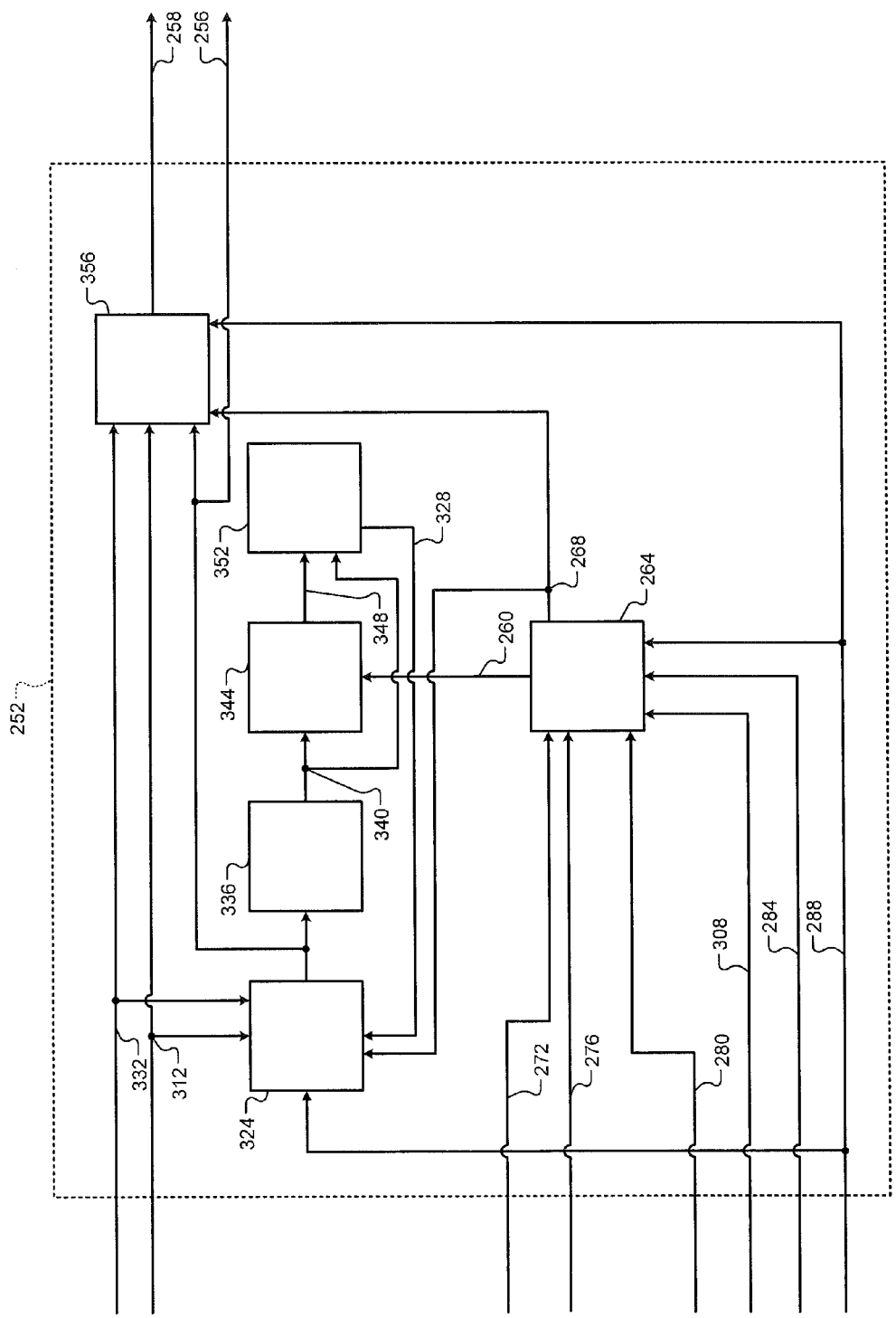
FIG. 3 is a functional block diagram of an air per cylinder (APC) module according to the present disclosure.

FIG. 3 includes a functional block diagram of an example implementation of the APC module 252. Referring now to FIGS. 2 and 3, the APC module 252 also determines a mass of air that is actually trapped within the present (activated) cylinder in the firing order. The mass of air trapped within the present cylinder in the firing order will be referred to as a measured APC 260.

A measured APC module 264 determines the measured APC 260. When in a steady-state condition, the measured APC module 264 may set the measured APC 260 equal to a MAF based APC 268. The measured APC module 264 may determine the MAF based APC 268 based on a MAF 272 measured using the MAF sensor 186. For example only, the MAF based APC 268 may be set equal to or based on an integral of the MAF 272 over a predetermined period. The steady-state condition may occur, for example, when a change in a pressure within the intake manifold 110 (e.g., a MAP 276 measured using the MAP sensor 184) over a predetermined period is less than a predetermined amount.

The measured APC module 264 updates a volumetric efficiency (VE) correction (not shown) when in the steady-state condition. The measured APC module 264 determines the VE correction based on a temperature of the air trapped within the present cylinder (charge temperature) 280, a volumetric efficiency (VE) 284, an intake port pressure 288, a cylinder volume, and the ideal (or universal) gas constant. The measured APC module 264 may determine the VE correction, for example, using one or more functions and/or mappings that relate the charge temperature 280, the VE 284, the intake port pressure 288, the cylinder volume, and the ideal (or universal) gas constant to the VE correction.

For example, when in the steady-state condition, the measured APC module 264 may determine the VE correction using the equation:

$$VECorr = \frac{APC_{MAF} * R * T}{\eta_e * V_{cyl} * P_{int}}, \tag{9}$$

where VECorr is the VE correction, $APC_{MAF}$ is the MAF based APC 268, R is the ideal gas constant, T is the charge temperature 280, $\eta_e$ is the VE 284, $V_{cyl}$ is the cylinder volume, and $P_{int}$ is the intake port pressure 288. The charge temperature 280 may be set equal to ambient air temperature or determined based on ambient air temperature and one or more other temperatures, such as engine coolant temperature (ECT). For example, the charge temperature 280 may be determined based on a weighted average of the ambient air temperature and the ECT, and the weighting may be set based on an APC. The cylinder volume and the ideal gas constants are predetermined values. The intake port pressure 288 corresponds to a predicted pressure within an intake port of the present cylinder at approximately intake valve closing. The intake port pressure 288 may be set equal to or determined based on, for example, a pressure within the intake manifold 110 (e.g., the MAP 276) measured a predetermined rotational distance before intake valve opening. The VE 284 is discussed further below.

When not in the steady-state condition, the measured APC module 264 may maintain the VE correction. In other words, when not in the steady-state condition, the measured APC module 264 may disable updating the VE correction as described above.

When not in the steady-state condition, the measured APC module 264 determines the measured APC 260 based on the VE correction, the charge temperature 280, the VE 284, the intake port pressure 288, the cylinder volume, and the ideal gas constant. The measured APC module 264 may determine the measured APC 260 when not in the steady-state condition, for example, using one or more functions and/or mappings that relate the VE correction, the charge temperature 280, the VE 284, the intake port pressure 288, the cylinder volume, and the ideal (or universal) gas constant to the measured APC 260.

For example, when not in the steady-state condition, the measured APC module 264 may determine the measured APC 260 using the equation:

$$APC_M = VECorr * \frac{\eta_e * V_{cyl} * P_{int}}{R * T}, \tag{10}$$

where $APC_M$ is the measured APC 260, VECorr is the VE correction, R is the ideal gas constant, T is the charge temperature 280, $\eta_e$ is the VE 284, $V_{cyl}$ is the cylinder volume, and $P_{int}$ is the intake port pressure 288.

A VE module 292 (see FIG. 2) determines the VE 284 based on the intake port pressure 288, an exhaust port pressure 296, an intake phase angle 300, an exhaust phase angle 304, an engine speed 308, and a cylinder activation/deactivation sequence used 312. The VE module 292 may determine the VE 284, for example, using one or more functions and/or mappings that relate the intake port pressure 288, the exhaust port pressure 296, the intake phase angle 300, the exhaust phase angle 304, the engine speed 308, and the cylinder activation/deactivation sequence used 312 to the VE 284.

For example, the VE module 292 may determine the VE 284 using the relationship:

$$VE = f\left(\frac{P_{int}}{P_{Exh}}, RPM, \theta_{int}, \theta_{Exh}, SequenceUsed\right), \tag{11}$$

where VE is the VE 284, $P_{Int}$ is the intake port pressure 288, $P_{Exh}$ is the exhaust port pressure 296, $\theta_{Int}$ is the intake phase angle 300, $\theta_{Exh}$ is the exhaust phase angle 304, RPM is the engine speed 308, and SequenceUsed is the cylinder activation/deactivation sequence used 312. As described above, the intake port pressure 288 corresponds to a predicted pressure within the intake port of the present cylinder at approximately intake valve closing. The exhaust port pressure 296 corresponds to pressure at an exhaust port of the present cylinder at approximately exhaust valve closing. The exhaust port pressure 296 may be determined, for example, based on an APC and the engine speed 308. An engine speed module 316 may determine the engine speed 308 based on a crankshaft position 320 measured using the crankshaft position sensor 180. The intake phase angle 300 may refer to the intake cam phaser position or intake valve phasing relative to crankshaft position. The exhaust phase angle 304 may refer to the exhaust cam phaser position or exhaust valve phasing relative to crankshaft position.

A sequence monitoring module 322 monitors the desired cylinder activation/deactivation sequence 248 and sets the cylinder activation/deactivation sequence used 312 based on the desired cylinder activation/deactivation sequence 248. When a cylinder is activated or deactivated according to the desired cylinder activation/deactivation sequence 248, an oldest entry of the cylinder activation/deactivation sequence used 312 is removed, and the cylinder activation/deactivation sequence used 312 is updated to reflect whether the cylinder was activated or deactivated. This process is repeated for each cylinder in the firing order.

The cylinder activation/deactivation sequence used 312 therefore indicates the pattern or sequence of how the last Q cylinders in the firing order were activated and/or deactivated. Q is an integer greater than one and may, for example, be equal to the number of cylinders addressed over a predetermined number of crankshaft rotations, such as two crankshaft rotations (one engine cycle), three crankshaft rotations, four crankshaft rotations, or more crankshaft rotations. Q may therefore be greater than 1 and less than the total number of cylinders of the engine 102, or Q may be greater than or equal to the total number of cylinders of the engine 102. The pattern may be stored, for example, a buffer (e.g., ring, circular, first-in first-out), a register, an array, a vector, or in another suitable form. A zero may indicate that the corresponding cylinder was activated, and a one may indicate that the corresponding cylinder was deactivated, or vice versa. For example only, the following may be an example of the cylinder activation/deactivation sequence used 312 where the last Q cylinders were alternately activated and deactivated and Q is equal to 8.

(12) [0 1 0 1 0 1 0 1]

The VE module 292 may alternatively determine the VE 284 using the equation:

$$VE = BaseVE * Mult + Offset, \quad (13)$$

where $$BaseVE = f\left(\frac{P_{int}}{P_{Exh}}, RPM\right), \quad (14)$$

$$Mult = f(\theta_{int}, \theta_{Exh}, SequenceUsed), \text{ and} \quad (15)$$

$$Offset = f(\theta_{int}, \theta_{Exh}, SequenceUsed), \quad (16)$$

VE is the VE 284, $P_{Int}$ is the intake port pressure 288, $P_{Exh}$ is the exhaust port pressure 296, $\theta_{Int}$ is the intake phase angle 300, $\theta_{Exh}$ is the exhaust phase angle 304, RPM is the engine speed 308, SequenceUsed is the cylinder activation/deactivation sequence used 312, BaseVE is a base (or initial) value of the VE 284, Mult is a multiplier value for BaseVE, and Offset is a VE offset value. BaseVE, Mult, and Offset may be determined using functions or mappings. For example, BaseVE may be determined using a two-dimensional mapping. Mult and Offset may be determined using polynomials or could be represented, for example, by bi-cubic splines.

A first APC prediction module 324 (see FIG. 3) generates the first predicted APC 256. The first APC prediction module 324 determines the first predicted APC 256 based on the MAF based APC 268, the intake port pressure 288, the cylinder activation/deactivation sequence used 312, a corrected APC 328, a throttle opening 332, and a location of the next (activated) cylinder in the firing order. The first APC prediction module 324 may determine the first predicted APC 256, for example, using one or more functions and/or mappings that relate the MAF based APC 268, the intake port pressure 288, the cylinder activation/deactivation sequence used 312, the corrected APC 328, the throttle opening 332, and the location of the next cylinder to the first predicted APC 256.

For example, the first APC prediction module 324 may determine the first predicted APC 256 using the equation:

$$APC1 = \alpha_0 * APCCorr(k) + \Sigma_{i=1}^{2} \alpha_i APC_{MAF}(k-i) + \Sigma_{j=0}^{2} \beta_j P_{Int}(k-j) + \Sigma_{l=0}^{2} \gamma_l Throttle(k-l) + \Sigma_{m=0}^{2} \delta_m * f(SequenceUsed, Cyl\#) \quad (17)$$

where APC1 is the first predicted APC 256, APCCorr is the corrected APC 328, $APC_{MAF}$ is the MAF based APC 268, $P_{Int}$ is the intake port pressure 288, Throttle is the throttle opening 332, SequenceUsed is the cylinder activation/deactivation sequence used 312, Cyl# is the location of the next cylinder in the firing order, and α, β, γ, and δ are coefficients. α, β, γ, and δ are predetermined values. The first APC prediction module 324 may determine α, β, γ, and δ, for example, based on the engine speed 308 and/or a pressure within the intake manifold 110 (e.g., the MAP 276). The throttle opening 332 corresponds to a present opening (e.g., position, area, etc.) of the throttle valve 112. As such, the first predicted APC 256 is determined based on the MAF based APC 268 for the last two activated cylinders, the intake port pressure 288 for the last three activated cylinders, the throttle opening 332 for the last two cylinders, the location of the next cylinder in the firing order, and the cylinder activation/deactivation sequence used 312 over the last predetermined period. While use of 3 samples in the summations is described, a greater number of samples may be used in various implementations.

A delay module 336 receives the first predicted APC 256 and outputs a previous value of the first predicted APC 256 as a previous APC 340. The previous APC 340 may therefore correspond to the first predicted APC 256 for the last (activated) cylinder in the firing order. For example only, the delay module 336 may include a one-unit, first-in-first-out (FIFO) buffer.

An error module 344 determines an APC error 348 based on the previous APC 340 and the measured APC 260. The error module 344 may, for example, set the APC error 348 equal to or based on a difference between the previous APC 340 and the measured APC 260.

An APC correction module 352 generates the corrected APC 328. The APC correction module 352 determines the corrected APC 328 based on the APC error 348 and the previous APC 340. The APC correction module 352 may determine the corrected APC 328, for example, using one or more functions and/or mappings that relate the APC error 348 and the previous APC 340 to the corrected APC 328. For example only, the APC correction module 352 may determine the corrected APC 328 using the equation:

$$APCCorr = APC_{Prev} + K*(APC_M - APC_{Prev}) \quad (18)$$

where APCCorr is the corrected APC 328, K is a coefficient, $APC_M$ is the measured APC 260, and $APC_{Prev}$ is the previous APC 340. K may be a predetermined value or may be set, for example, using Kalman filtering theory, state-observer theory, or in another suitable manner.

A second APC prediction module 356 generates the second predicted APC 258. The second APC prediction module 356 determines the second predicted APC 258 based on the first predicted APC 256, the MAF based APC 268, the intake port pressure 288, the cylinder activation/deactivation sequence used 312, the throttle opening 332, and the location of the next (activated) cylinder following the next cylinder in the firing order. The second APC prediction module 356 may determine the second predicted APC 258, for example, using one or more functions and/or mappings that relate the first predicted APC 256, the MAF based APC 268, the intake port pressure 288, the cylinder activation/deactivation sequence used 312, the throttle opening 332, and the location of the activated cylinder following the next cylinder in the firing order.

For example, the second APC prediction module 356 may determine the second predicted APC 258 using the equation:

$$APC2 = \alpha_0 * APC1(k) + \Sigma_{i=1}^{2} \alpha_i APC_{MAF}(k-i) + \Sigma_{j=0}^{2} \beta_j P_{Int}(k-j) + \Sigma_{l=0}^{2} \gamma_l Throttle(k-l) + \Sigma_{m=0}^{2} \delta_m * f(SequenceUsed, Cyl\#) \quad (19)$$

where APC2 is the second predicted APC 258, APC1 is the first predicted APC 256, $APC_{MAF}$ is the MAF based APC 268, $P_{Int}$ is the intake port pressure 288, Throttle is the throttle opening 332, SequenceUsed is the cylinder activation/deactivation sequence used 312, Cyl# is the location of the activated cylinder following the next cylinder, and α, β, γ, and δ are the coefficients. While use of 3 samples in the summations is described, a greater number of samples may be used in various implementations.

The fuel control module 232 may regulate fueling based on the second predicted APC 258. For example, the fuel control module 232 may control fueling to the next (activated) cylinder following the next (activated) cylinder in the firing order based on achieving a predetermined air/fuel ratio (e.g., a stoichiometric air/fuel ratio) with the second predicted APC 258.

A torque estimation module 360 generates an estimated torque output of the engine 102 based on the first predicted APC 256. The estimated torque output of the engine 102 may be referred to as engine torque 364. One or more engine operating parameters may be regulated based on the engine torque 364. For example, the boost control module 240, the throttle control module 216, and/or the phaser control module 237 may generate the desired boost 242, the desired throttle opening 220, and/or the desired intake and/or exhaust cam phaser angles 238 and 239, respectively, based on the engine torque 364. Engine load and/or one or more other parameters may be determined based on the first predicted APC 256. Spark timing and/or one or more other engine operating parameters may be regulated based on the first predicted APC 256.

Figure 4:
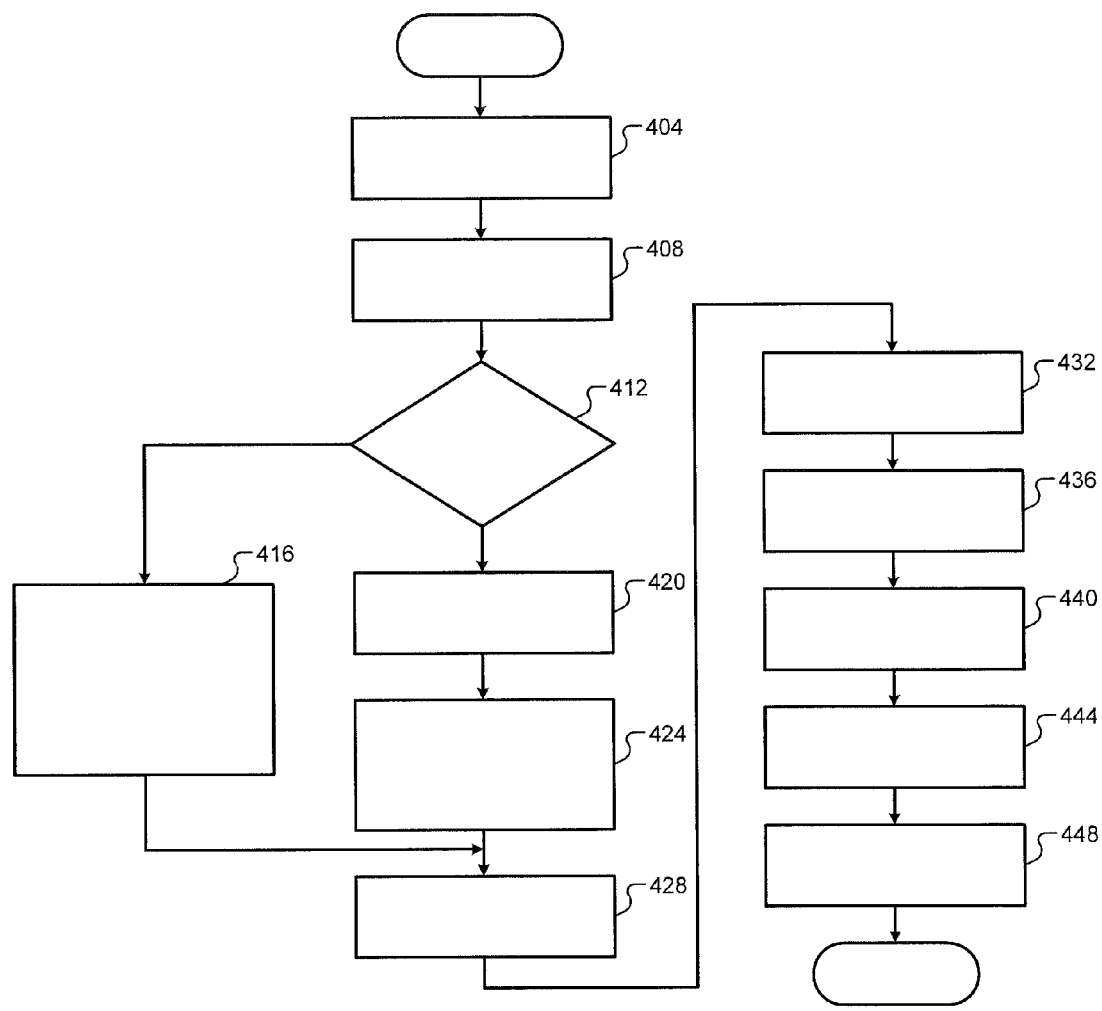
FIG. 4 is a flowchart depicting an example method of predicting APC according to the present disclosure.

Referring now to FIG. 4, a flowchart depicting an example method of generating the first and second predicted APCs 256 and 258 is presented. Control may begin with 404 where control receives the data for determining the first and second predicted APCs 256 and 258. At 408, the VE module 292 determines the VE 284. The VE module 292 determines the VE 284 based on the intake port pressure 288, the exhaust port pressure 296, the intake phase angle 300, the exhaust phase angle 304, the engine speed 308, and the cylinder activation/deactivation sequence used 312. For example, the VE module 292 may determine the VE 284 using (11) or (13), as described above.

At 412, control determines whether the steady-state condition is present. If false, control continues with 416; if true, control continues with 420. The steady-state condition may be present, for example, when a change in pressure within the intake manifold 110 (e.g., the MAP 276 measured using the MAP sensor 184) over a predetermined period is less than a predetermined amount.

The measured APC module 264 determines the measured APC 260 at 416 based on the VE correction, the charge temperature 280, the VE 284, the intake port pressure 288, the cylinder volume, and the ideal gas constant. For example, when not in the steady-state condition, the measured APC module 264 may determine the measured APC 260 using (10), as described above. Control continues with 428, which is discussed further below.

At 420, when in the steady-state condition, the measured APC module 264 updates the VE correction. The measured APC module 264 determines the VE correction based on the charge temperature 280, the VE 284, the intake port pressure 288, the cylinder volume, and the ideal (or universal) gas constant, for example, using (9), as described above. Control continues with 424.

The measured APC module 264 sets the measured APC 260 equal to the MAF based APC 268 at 424. The measured APC module 264 may determine the MAF based APC 268 based on the MAF 272 measured using the MAF sensor 186. For example only, the MAF based APC 268 may be set equal to or based on an integral of the MAF 272 over a predetermined period. Control continues with 428.

At 428, the error module 344 determines the APC error 348. The error module 344 determines the APC error 348 based on a difference between the previous APC 340 and the measured APC 260. The APC correction module 352 determines the corrected APC 328 at 432. The APC correction module 352 determines the corrected APC 328 based on the APC error 348 and the previous APC 340. For example, the APC correction module 352 may determine the corrected APC 328 using (18), as described above.

The first APC prediction module 324 determines the first predicted APC 256 at 436. The first APC prediction module 324 determines the first predicted APC 256 based on the MAF based APC 268, the intake port pressure 288, the cylinder activation/deactivation sequence used 312, the corrected APC 328, the throttle opening 332, and the location of the next cylinder in the firing order. For example, the first APC prediction module 324 may determine the first predicted APC 256 using (17), as described above. The delay module 336 stores the first predicted APC 256 and outputs the last value of the first predicted APC 256 as the previous APC 340 at 440.

At 444, the second APC prediction module 356 determines the second predicted APC 258. The second APC prediction module 356 determines the second predicted APC 258 based on the MAF based APC 268, the intake port pressure 288, the cylinder activation/deactivation sequence used 312, the first predicted APC 256, the throttle opening 332, and the location of the next cylinder following the next cylinder in the firing order. For example, the second APC prediction module 356 may determine the second predicted APC 258 using (19), as described above. At 448, one or more engine operating parameters are controlled based on the first predicted APC 256 and/or the second predicted APC 258, and control may end. While control is shown and discussed as ending after 448, FIG. 4 may be illustrative of one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A cylinder control system of a vehicle, comprising:
a cylinder control module that determines a desired cylinder activation/deactivation sequence and that activates and deactivates valves of cylinders of an engine based on the desired cylinder activation/deactivation sequence; and
an air per cylinder (APC) prediction module that predicts an amount of air that will be trapped within a next activated cylinder in a firing order of the cylinders based on (i) a cylinder activation/deactivation sequence of the last Q cylinders in the firing order, (ii) an intake port pressure, (iii) a second amount of air per cylinder determined based on a mass air flowrate (MAF) into the engine, (iv) a throttle opening, (v) a corrected amount APC, and (vi) a location of the next activated cylinder in the firing order of the cylinders,
where Q is an integer greater than one;
an error module that determines an APC error based on a measured amount of air trapped within the present activated cylinder in the firing order and a previous value of the amount of air that will be trapped within the next activated cylinder;
an APC correction module that determines the corrected APC based on the APC error and the previous value of the amount of air that will be trapped within the next activated cylinder; and
a spark control module that sets a spark timing for the next activated cylinder based on the amount of air that will be trapped within the next activated cylinder; and a spark actuator module that energizes a spark plug in the next activated cylinder based on the spark timing.

2. The cylinder control system of claim 1 further comprising a second APC prediction module that predicts a second amount of air that will be trapped within a second activated cylinder based on the cylinder activation/deactivation sequence of the last Q cylinders in the firing order,
wherein the second activated cylinder follows the next activated cylinder in the firing order.

3. The cylinder control system of claim 2 wherein the second APC prediction module predicts the second amount of air that will be trapped within the second activated cylinder further based on a location of the second activated cylinder in the firing order.

4. The cylinder control system of claim 2 wherein the second APC prediction module predicts the second amount of air that will be trapped within the second activated cylinder further based on the amount of air that will be trapped within the next activated cylinder.

5. The cylinder control system of claim 2 further comprising a fuel control module that controls fueling to the second activated cylinder based on the second amount of air that will be trapped within the second activated cylinder.

6. The cylinder control system of claim 1 further comprising:
a torque estimation module that determines an estimated torque output of the engine based on the amount of air that will be trapped within the next activated cylinder; and
at least one of:
a boost control module that controls a boost device of the engine based on the estimated torque output;
a throttle control module that controls a throttle valve based on the estimated torque output; and
a phaser control module that controls intake and exhaust valve phasing based on the estimated torque output.

7. A cylinder control method comprising:
determining a desired cylinder activation/deactivation sequence;
activating and deactivating valves of cylinders of an engine based on the desired cylinder activation/deactivation sequence; and
predicting an amount of air that will be trapped within a next activated cylinder in a firing order of the cylinders based on (i) a cylinder activation/deactivation sequence of the last Q cylinders in the firing order, (ii) an intake port pressure, (iii) a second amount of air per cylinder determined based on a mass air flowrate (MAF) into the engine, (iv) a throttle opening, (v) a corrected amount of air per cylinder (APC), and (vi) a location of the next activated cylinder in the firing order of the cylinders,
where Q is an integer greater than one;
determining an APC error based on a measured amount of air trapped within the present activated cylinder in the firing order and a previous value of the amount of air that will be trapped within the next activated cylinder;
determining the corrected APC based on the APC error and the previous value of the amount of air that will be trapped within the next activated cylinder; and setting a spark timing for the next activated cylinder based on the amount of air that will be trapped within the next activated cylinder; and energizing a spark plug for the next activated cylinder based on the spark timing.

8. The cylinder control method of claim 7 further comprising predicting a second amount of air that will be trapped within a second activated cylinder based on the cylinder activation/deactivation sequence of the last Q cylinders in the firing order,
wherein the second activated cylinder follows the next activated cylinder in the firing order.

9. The cylinder control method of claim 8 further comprising predicting the second amount of air that will be trapped within the second activated cylinder further based on a location of the second activated cylinder in the firing order.

10. The cylinder control method of claim 8 further comprising predicting the second amount of air that will be trapped within the second activated cylinder further based on the amount of air that will be trapped within the next activated cylinder.

11. The cylinder control method of claim 8 further comprising controlling fueling to the second activated cylinder based on the second amount of air that will be trapped within the second activated cylinder.

12. The cylinder control method of claim 7 further comprising:
determining an estimated torque output of the engine based on the amount of air that will be trapped within the next activated cylinder; and
at least one of:
controlling a boost device of the engine based on the estimated torque output;
controlling a throttle valve based on the estimated torque output; and
controlling intake and exhaust valve phasing based on the estimated torque output.

* * * * *